United States Patent
Niss (10) Patent No.: US 10,149,155 B2
(45) Date of Patent: Dec. 4, 2018

(54) AUTHENTICATION METHOD FOR A PASSENGER AND CORRESPONDING SOFTWARE

(71) Applicant: LUFTHANSA TECHNIK AG, Hamburg (DE)

(72) Inventor: Frank Niss, Hamburg (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 751 days.

(21) Appl. No.: 14/381,947

(22) PCT Filed: Feb. 8, 2013

(86) PCT No.: PCT/EP2013/000372
§ 371 (c)(1),
(2) Date: Aug. 28, 2014

(87) PCT Pub. No.: WO2013/127488
PCT Pub. Date: Sep. 6, 2013

(65) Prior Publication Data
US 2014/0380501 A1   Dec. 25, 2014

(30) Foreign Application Priority Data
Feb. 28, 2012 (DE) ........................ 10 2012 203 032

(51) Int. Cl.
*G06Q 20/00* (2012.01)
*H04W 12/06* (2009.01)
(Continued)

(52) U.S. Cl.
CPC ............ *H04W 12/06* (2013.01); *G06F 21/62* (2013.01); *H04L 63/08* (2013.01); *H04B 7/18506* (2013.01)

(58) Field of Classification Search
CPC ...................................................... G06Q 10/62
(Continued)

(56) References Cited

U.S. PATENT DOCUMENTS

| 6,052,604 A * | 4/2000 | Bishop, Jr. ......... H04B 7/18506 455/411 |
| 2007/0214364 A1* | 9/2007 | Roberts ................... G06F 21/31 713/179 |

(Continued)

FOREIGN PATENT DOCUMENTS

| EP | 2 345 975 | 7/2011 |
| WO | WO-2005/104489 | 11/2005 |
| WO | WO-2009/097042 | 8/2009 |

OTHER PUBLICATIONS

Kontron, "Kontron liefert Flugzeug-Equipment für die WLAN Inflight Entertainment Lösung von Lufthansa Systems," pp. 1-3.
(Continued)

*Primary Examiner* — Chinedu C Agwumezie
(74) *Attorney, Agent, or Firm* — Saliwanchik, Lloyd & Eisenschenk (57) ABSTRACT

Authentication method and corresponding software for a passenger of an aircraft of an airline, wherein a data processing apparatus of the airline generates flight-specific authentication data for the use of an on-board communication device, and the authentication data are transmitted to a portable passenger device of the passenger by means of a communication network. The authentication data allow the authentication of the passenger device by wirelessly transmitting the authentication data to the onboard communication device.

20 Claims, 2 Drawing Sheets

(51) Int. Cl.
  *H04L 29/06*    (2006.01)
  *G06F 21/62*    (2013.01)
  *H04B 7/185*    (2006.01)
(58) Field of Classification Search
  USPC .................................................... 705/26, 50
  See application file for complete search history.

(56) References Cited

U.S. PATENT DOCUMENTS

| | | | |
|---|---|---|---|
| 2011/0119485 A1 | 5/2011 | Killian et al. | |
| 2012/0284803 A1* | 11/2012 | Wang ...................... | G06F 21/10 726/27 |
| 2016/0148449 A1* | 5/2016 | God ................... | G07C 9/00087 340/5.6 |

OTHER PUBLICATIONS

Lufthansa, "Genießen vor und nach dem Flug," *Newslink*, pp. 1-18.
Postel, P., et al., "Sicherheitsempfehlungen für Public Wireless Hotspots," pp. 1-5.
T-Mobile, "Allgemeine Geschäftsbedingungen T-Mobile HotSpot Gmbh," pp. 1-3.

* cited by examiner

AUTHENTICATION METHOD FOR A PASSENGER AND CORRESPONDING SOFTWARE

CROSS-REFERENCE TO RELATED APPLICATIONS

The present application is the U.S. National Stage Application of International Patent Application No. PCT/EP2013/000372, filed on Feb. 8, 2013, which claims priority to German Patent Application No. 10 2012 203 032.8, filed on Feb. 28, 2012, both of which are hereby incorporated by reference herein in their entirety, including any figures, tables, or drawings.

The invention relates to an authentication method for a passenger of an aircraft and to software for a passenger device which controls said passenger device in order for it to receive flight-specific access data generated by a data processing apparatus of the airline via a communication network, the access data on the passenger device allowing access to the aircraft.

Nowadays, passengers of an aircraft can purchase an airline ticket electronically, for example. The airline ticket in the form of a boarding pass having the corresponding access data is frequently also delivered electronically. For the passenger to access the airport and the aircraft, said electronically delivered access data are either printed on paper or are used in electronic form on a portable passenger device and are reproduced or transmitted at the appropriate point. A passenger device may be a mobile telephone or a portable computer, or any hybrid thereof such as a smartphone or tablet computer, which belongs to the respective passenger and which said passenger carries with him.

In addition to merely transporting passengers and their luggage, airlines offer passengers various services and entertainment options during the flight, for example access to worldwide data networks, such as internet or telephone networks, and in-flight entertainment systems. The in-flight entertainment systems may be used in part together with a terminal device of the passenger, a passenger device.

One drawback is the complex connection of a passenger device to the in-flight entertainment system of the aircraft. Furthermore, personalised use of the in-flight entertainment system and of an external communication apparatus is not possible using the passenger device.

The problem addressed by the invention is that of providing an efficient and easy-to-use authentication method and corresponding software for a passenger device of a passenger.

This problem is solved with the features of the independent claims. In an authentication method for a passenger of an aircraft of an airline, according to the invention a data processing apparatus of the airline generates flight-specific authentication data for the use of an on-board communication device. Furthermore, according to the invention the authentication data are transmitted to a portable passenger device of the passenger by means of a communication network, the authentication data allowing the authentication of the passenger device by wirelessly transmitting the authentication data to an on-board communication device.

Generation of authentication data and transmission to a passenger device according to the invention are advantageous because the required authentication data for a use of an on-board communication system in the aircraft are available electronically on the passenger device in this way. The passenger device can thus be authenticated automatically when wireless communication with an on-board communication device of the on-board communication system takes place, thereby making it possible for the passenger to easily use an on-board communication system via the on-board communication device.

The authentication data preferably include all the data that are required to establish wireless access to a secured on-board communication system using a passenger device. The access is typically limited to those passengers who are on the corresponding flight, so that the authentication data are flight-specific. Alternatively, it is also possible to provide an access time limit after the scheduled start of the flight or after a first use. The authentication data allow verification that the passenger has appropriate access rights, either in general or for a particular flight.

In this context, flight-specific means that electronic authentication data and/or access data for physical access to a certain flight of an aircraft are provided. Here, a flight relates to the process of transporting persons from one airport to another airport. Flight-specific authentication data or access data relate to this transport process and to the associated boarding- and disembarkation processes. Flight-specific authentication data or access data lose their validity after the end of the flight or transport process, so that the authentication and/or the access becomes invalid either electronically by means of a passenger device or physically for persons after a flight when the passengers disembark.

Preferably, a data processing apparatus of the airline generates flight-specific access data for a passenger, the access data being transmitted to a portable passenger device of the passenger by means of a communication network. The access data on the passenger device allow access to the aircraft. In combination with an identification document, the access data allow persons to be monitored and allow corresponding access rights to the aircraft and/or to the airport.

The access data generally include the flight number, the passenger name, origin and destination, time of departure, seat number and/or the flight operator.

The authentication data are preferably transmitted together with the access data to the passenger device in a single message. A single message may for example be an email, an MMS or any other message format which is capable of transmitting the access data and the authentication data together. Here, single means transmission of the data at the same time, so that for example the transmitted access data that generally make up an electronic boarding pass are combined with additional authentication data, whereby, by means of the electronic boarding pass, wireless access to an on-board communication system in the aircraft can also be made possible in addition to access to the aircraft.

Transmitting the access data at the same time as the authentication data allows the passenger, by means of the access data, to easily use an electronic boarding pass with his portable passenger device, so that local access of the passenger to the aircraft can be achieved using the passenger device. Furthermore, when the passenger is on the aircraft, he can use the on-board communication system using the same device and the same message, so that by integrating access data and authentication data, ease of use is achieved. As a result, for connecting the passenger device to the on-board communication system, optionally only the consent of the user or the passenger is required.

In an advantageous embodiment, the generated authentication data contain encryption information for the communication between the passenger device and the on-board communication device. Encryption information which has been transmitted to the passenger device in advance together with the authentication data is advantageous for secure communication between an on-board communication device and the passenger device, since in this way, third parties, for example other passengers having other passenger devices, cannot gain unauthorised access to the data exchange. This increases the overall data security for the passenger.

In a further possible embodiment, the authentication data are transmitted to the passenger device in the form of a link. By transmitting a link, it is possible in a simple manner to initially allow each passenger device only rudimentary communication with the on-board communication device which allows the link to be selected, whereby continuing communication together with the use by the on-board communication system of various types of media content and/or of data connections of the on-board communication system is made possible using the passenger device.

Preferably, the access data are processed and provided by software installed on the passenger device for processing and use. Software installed on the passenger device allows the access data to be simply displayed and provided in a manner adapted to the respective device in order for the passenger to pass an access check on the aircraft.

Furthermore, the authentication data are processed and provided by software installed on the passenger device for processing and use. In this way, the authentication data may allow authentication adapted to the passenger device in the case of wireless communication with the on-board communication device, whereby possible manual adaptations on the part of the passenger are prevented. Furthermore, it is possible for the passenger to gain simple and direct access via the installed software to the media content of the on-board communication system, which content also can be displayed by the installed software in a manner adapted to the requirements of the passenger device.

During authentication, the hardware address of the passenger device is preferably stored in the on-board communication device and is used for further authentication. As a result, the passenger device is uniquely identified in the on-board communication device, so that the hardware address can be used in a further use for authentication, thereby simplifying communication between the passenger device and the on-board communication device. Here, the hardware address is a unique identifier of the wirelessly active element, and is also known as the MAC address or physical address.

Furthermore, after the end of the authentication method, the on-board communication device preferably allows the passenger personalised access to an in-flight entertainment system using the passenger device. Personalised access is advantageous in order for it to be possible, for example, to greet and address the passenger directly in an in-flight entertainment system using his name and in a language which he can understand. Furthermore, personalised access makes it possible to offer various types of media content which are adapted to the passengers, so that for example different booking- and/or purchase options and thus access options can be available for the media content.

The personalised use of an on-board communication system and/or an in-flight entertainment system makes it possible to offer the content on offer, such as films, music or data connections, to each passenger individually as an add-on package when purchasing the flight ticket and to charge for the corresponding use, for example an external data connection based on the volume used. Furthermore, it is possible to limit the data volume which can be transmitted for each passenger, in order to prevent the external communication apparatus of the aircraft from being overloaded.

A combination of the authentication data with the access data allows authentication which is linked to the seat for example, so that the wireless connection to the on-board communication device can be accordingly set up.

In a preferred embodiment, after authentication, the on-board communication device allows the passenger access to at least one external data connection using the passenger device. External data connections may, inter alia, offer the passenger a connection to worldwide data networks via his own passenger device while on the aircraft. For this purpose, the aircraft has an external communication apparatus, which typically has a higher capacity in terms of range than the passenger devices. For example, an external communication apparatus can set up a satellite-based external data connection. The external data connection can make it possible for the passenger to access worldwide data networks, such as the internet.

In an advantageous embodiment, the passenger controls at least one playback device of the in-flight entertainment system, which is connected to the on-board communication device, using the passenger device. Each playback device is preferably associated with a seat in the aircraft, and is set up to play media content of the in-flight entertainment system. The option of being able to control one or more playback devices, which for example can play sounds and images, using his own passenger device creates a positive association with the aircraft and the airline on the part of the passenger. Furthermore, the passenger device provides ease of use which may go beyond the on-board user options. In addition, the passenger can operate these systems using his accustomed device.

The problem addressed by the invention is furthermore solved by software for a passenger device, which controls the passenger device in order to carry out the reception of flight-specific access data, generated by a data processing apparatus of the airline, in the passenger device via a communication network, the access data on the passenger device allowing access to the aircraft. The steps of receiving additional flight-specific authentication data, generated by the data processing apparatus, via a communication network, and authenticating the passenger device by wirelessly transmitting the authentication data to an on-board communication device are in accordance with the invention.

The software makes it possible to directly authenticate the passenger using his passenger device during wireless communication with the on-board communication device, so that the authentication method can take place efficiently and without further action on the part of the passenger. For this purpose, the software controls the passenger device to carry out the wireless authentication on the on-board communication device. Furthermore, the software preferably provides personalised access to the in-flight entertainment system and to an external data connection via the in-flight entertainment system and on-board communication system. The external data connection may preferably also be used by additional, independent software. Furthermore, the software preferably provides various control options for on-board playback devices via a control interface.

The invention is explained in the following on the basis of preferred embodiments with reference to the accompanying drawings, in which.

Figure 1A:
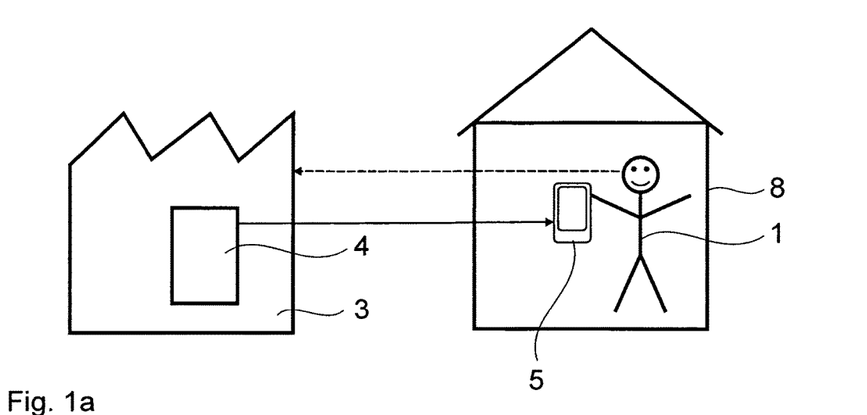
FIG. 1a-1c show an authentication method for a passenger using a smartphone.

FIG. 1 shows an embodiment of an authentication method for a passenger 1, a passenger 1, in FIG. 1a, being in his home 8, for example, before a flight. Here, he books a flight ticket with an airline 3. The flight ticket can be purchased in various ways, for example via an internet portal, over the telephone or from an agency. After purchasing the flight ticket for a particular flight, flight-specific authentication data are generated in a data processing apparatus 4 of the airline 3 for the use of the on-board communication system of the aircraft.

The flight-specific authentication data are transmitted to a portable passenger device 5 of the passenger 1 via any desired communication network.

In an advantageous embodiment, an electronic boarding pass having the access data for the passenger 1 together with the authentication data is transmitted to the portable passenger device 5. In this case, the data can be transmitted by means of an email, an MMS or another appropriate data format, so that both types of data are sent in a single message by the data processing apparatus 4.

In an embodiment, the passenger 1 has software on his portable passenger device 6 via which, in an advantageous embodiment, he is registered as a user, so that the software receives the flight-specific access data and authentication data generated by a data processing apparatus 4 of the airline 3.

Figure 1B:
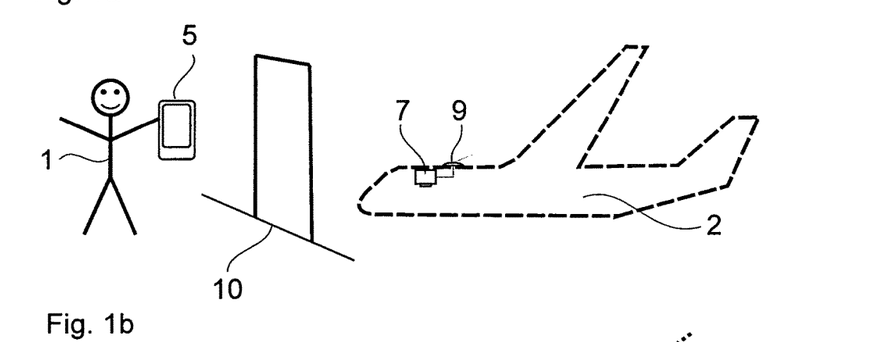

In FIG. 1b, the passenger 1 is at the airport shortly before his booked flight is due to depart. He is carrying his portable passenger device 5 with him and gains access, at a turnstile 10, to the boarding area of the airport and to the aircraft 2 using an identification document and the access data stored on the portable passenger device 5. In a typical embodiment, the access data are represented visually as a 2D barcode on the portable passenger device and are read visually by a part of the turnstile 10. Alternatively, wireless-based near-field communication (NFC) systems for personal transmission of the access data from the portable passenger device 5 to the turnstile 10 may be used.

Once the passenger 1 has passed the check for access to the aircraft 2, he makes his way to his seat on the aircraft 2. In this embodiment, the aircraft 2 has an in-flight entertainment system, which in this case is also an on-board communication system. For this purpose, the aircraft 2 has an on-board communication device 7, so that the passenger 1 can gain access to a media server while on board. In this case, the connection to the passenger devices 5 is established primarily wirelessly via a wireless data access point on the aircraft 2. A media server provides a plurality of passengers 1 with a choice of media entertainment including films, television and music, for example.

After the passengers 1 have boarded, the aircraft 2 is usually immediately in the take-off phase or in the take-off preparation phase, in which the operation of passenger devices 5 and in-flight entertainment systems is prohibited for safety reasons.

Figure 1C:
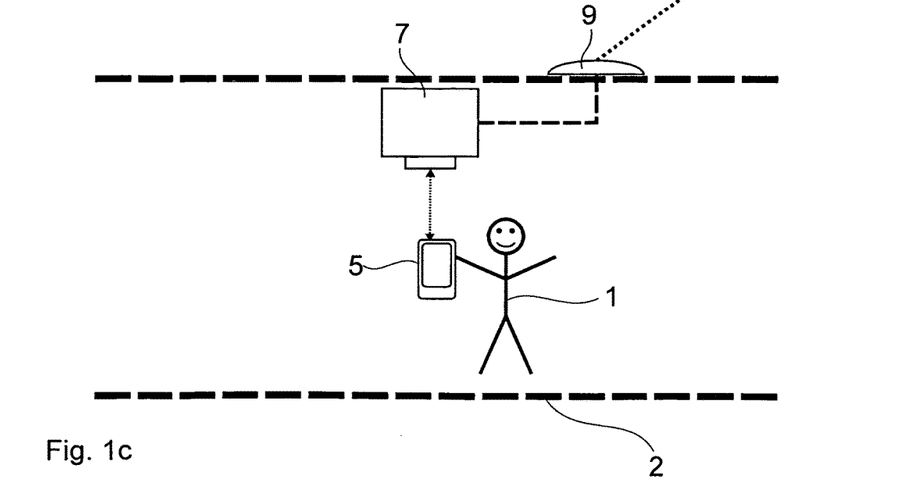

In FIG. 1c, the aircraft 2 is no longer in a critical flight phase, and the cabin crew powers up the on-board communication device 7 in the cabin of the aircraft 2. Furthermore, the passenger 1 activates his portable passenger device 5, which, just like the on-board communication device 7, is set up for wireless-based communication.

A rudimentary data connection is established between the passenger device 5 and the on-board communication device 7 which allows the authentication. The passenger 1 selects the appropriate message having the authentication data on his passenger device 5, and begins the actual authentication process for example by clicking a link, the passenger device 5 which has flight-specific authentication data assigned to the passenger 1 logging into and registering on the on-board communication device 7.

In an advantageous embodiment, after the passenger 1 is authenticated using his passenger device 5, the hardware address thereof is stored in the on-board communication device 7 or system for further use during the flight for further authentication, so that for example when the passenger device 5 and/or on-board communication device 7 is switched off temporarily, another authentication of the passenger device 5 assisted by the passenger 1 is no longer necessary.

After authentication, the passenger 1 gains access via his passenger device 5 to the media content, such as films or music, offered by the on-board communication device 7, the passenger 1 being able to listen to or watch said content on his passenger device 5. The access can take place here in a personalised manner, so that personally determined media content can be selected in advance or compiled. Furthermore, according to the authentication data, appropriate languages can be preset, so that the passenger 1 does not have to firstly set the language via a menu.

Furthermore, in an advantageous embodiment, the passenger 1 can use an external communication apparatus 9 of the aircraft 2 after authentication, and thus for example can use the internet in flight using his portable passenger device 5. Owing to the authentication having taken place, it is possible to assign the amount of data used to the passenger 1, whereby it becomes possible to fix the amount of data which can be downloaded by a passenger 1 or to charge a passenger for the amount of data. In addition, the passenger 1 could also order various data volumes in advance when booking.

In an advantageous embodiment, software which has been made available to the passenger 1 before the flight is installed on the passenger device 5. The software has advantageously received and stored the appropriate access- and authentication data. If the passenger 1 starts up this software while on the aircraft 2, in a possible embodiment, the software identifies the on-board communication device 7 as a wireless network via a wireless data access point and uses the available authentication data to authenticate the passenger device 5 on the on-board communication device 7. The passenger 1 then gains access to the available media which is stored on the on-board communication device 7 or a connected media server. By means of the software on the passenger device 5, this can take place directly in the software via a menu. Furthermore, in a possible embodiment, the software can be used directly to play the media content. In addition, functions within the aircraft 2 that are linked to the seat can be displayed by the software, such as food choices, a call function for a crew member and the control of playback devices assigned to the seat in the aircraft 2. For this purpose, combined transmission of the access data, which include the seat inter alia, and of the authentication data is advantageous.

Furthermore, the software can make it possible to manage the use of the external data connection and to provide other software applications on the portable passenger device 5 with access to the internet via the external communication apparatus 9 of the aircraft 2.

In a possible embodiment, the authentication data contain additional encryption information which may be used for secure, wireless communication between the passenger device 5 and the on-board communication device 7. In particular by using the appropriate software provided by the airline 3, it is possible to advantageously encrypt the data connection. The encryption is used inter alia to prevent other mobile devices owned by third parties on the aircraft 2 from intercepting the data transmitted, primarily via the external communication apparatus 9.

Once the flight is over, the passenger 1 leaves the aircraft 2, so that, in an advantageous embodiment, access to the on-board communication system using the authentication data or using the hardware address is then no longer possible, and can only be gained by a new authentication using authentication data that is valid for a subsequent flight. The hardware address can then be deleted and the appropriate data protocols, if necessary for charging for use, are transmitted to a data processing apparatus of the airline 3.

Figure 2A:
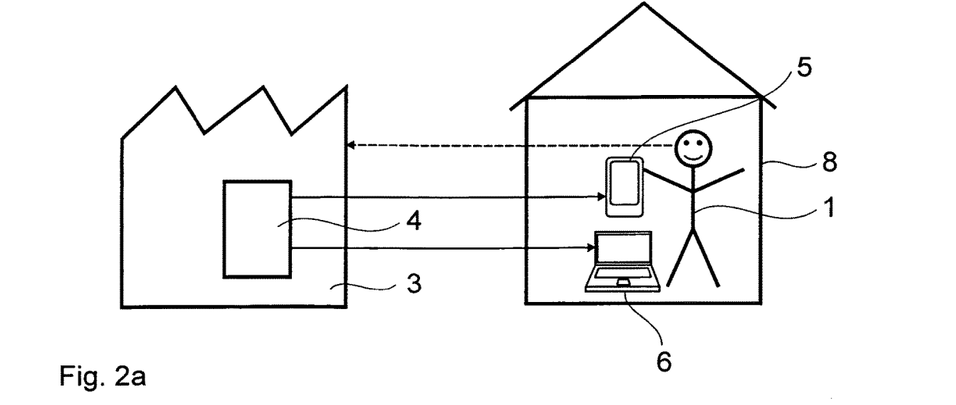
FIG. 2a-2c show an authentication method for a passenger using a smartphone and a laptop.

FIG. 2 shows an authentication method similar to that in FIG. 1. In this embodiment, however, the passenger 1 is carrying two portable passenger devices 5, 6 with him. As shown in FIG. 2a, these are a smartphone 5 and a laptop 6, which is a common device combination nowadays for air passengers. In this embodiment, in addition to the flight ticket, the passenger purchases a particular in-flight entertainment package and a data transfer volume of for example 100 MB. In this case, the flight ticket and the additional options can for example also be purchased using the corresponding software which is used for authentication. After the flight ticket is purchased, the authentication data are sent by the data processing apparatus of the airline 3 and as a result the authentication data are transmitted to the smartphone 5 and/or the laptop 6. In addition, the access data are transmitted to the smartphone 5 and/or the laptop 6. In an advantageous embodiment, access- and authentication data can be transmitted to both portable passenger devices 5, 6 in a single message.

Furthermore, the authentication data are transmitted to the on-board communication system using the on-board communication device 7 of the aircraft 2, so that said data are available before the start of the flight for later authentication.

Figure 2B:
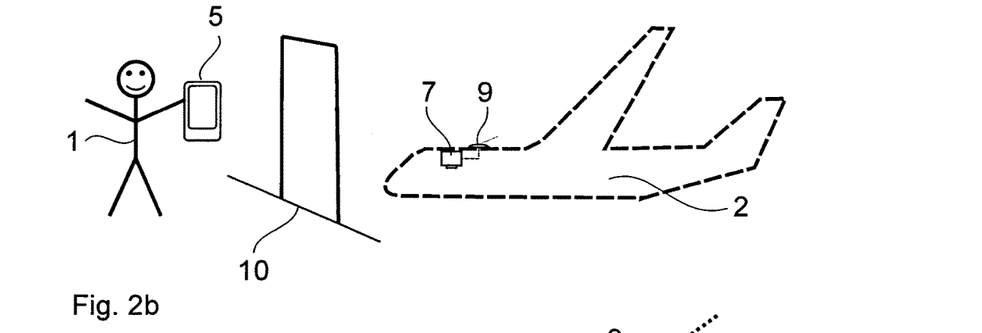

In FIG. 2b, the passenger 1 uses the access data stored for the flight on the smartphone 5 in the form of a passenger device 5, which access data is generally also referred to as an electronic boarding pass, in order to be identified as a passenger 1 of the corresponding flight. Alternatively, a paper printout can be used to provide the appropriate access data for passing through the turnstile 10 at the airport. Furthermore, the software used can be used to display the access data.

By contrast with the embodiment in FIG. 1, however, the passenger 1 uses his laptop 6 on the aircraft 2 as a passenger device 6 to gain access to the media server of the in-flight entertainment system via the on-board communication device 7. Owing to its design, the laptop 6 is typically not used to transmit the access data or the electronic boarding pass to the turnstile 10 in a suitable form, but is advantageous for displaying media content and for the effective use of an external data connection compared with the relatively small smartphone 5.

Figure 2C:
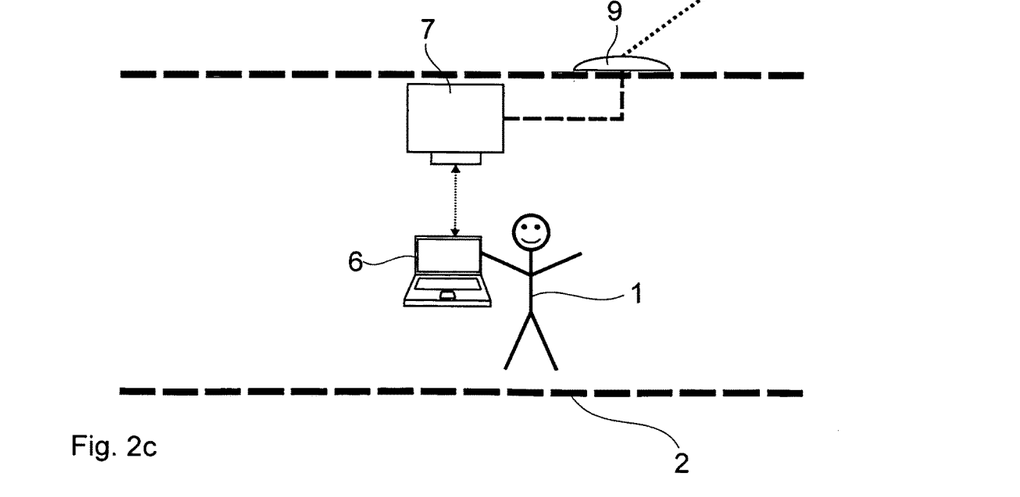

In FIG. 2c, the passenger 1 is authenticated via the wireless data access point on the on-board communication device 7 using his laptop 6 having the obtained authentication data, so that a personal and/or seat-based use of the on-board communication system of the media server is made possible. Furthermore, after authentication, said passenger can use the entirety of the in-flight entertainment system and, in this embodiment, can take advantage of his additionally purchased data transfer volume.

In possible advantageous embodiments, the authentication data in particular can be modified after being transmitted to a passenger device 5, 6. This is advantageous for adapting additions or modifications to what is being offered, such as the access to media content by an on-board communication device 7, shortly before a flight or directly and locally. For this purpose, the authentication data are preferably supplemented with additional electronic passwords.

A modification or addition of this type may, in a possible embodiment, also take place independently of a data connection to the data processing apparatus 4 of an airline 3. This may for example be made possible by having corresponding data locally available on a computer at the airport, for example in the passenger boarding area, so that it is possible to locally subsequently book additional functions or change a booking at short notice, for example to another flight. By having the corresponding data locally available, modifications of this type can be made without a data connection to the data processing apparatus 4 being available at all times.

In further possible embodiments, data can be stored in a passenger device 5, 6 which, in addition to the actual access data and authentication data for a flight, contain additional data which may be valid permanently, that is to say for several flights. Additional data of this type may for example include preferred food and drink orders, the preferred language or additional passenger-oriented profile data in an aircraft 2.

EMBODIMENTS

Embodiment 1

Authentication method for a passenger (1) of an aircraft (2) of an airline (3), characterised in that
a data processing apparatus (4) of the airline (3) generates flight-specific authentication data for use of an on-board communication device (7),
the authentication data are transmitted to a portable passenger device (5, 6) of the passenger (1) by means of a communication network,
the authentication data allowing the authentication of the passenger device (5, 6) by wirelessly transmitting the authentication data to the on-board communication device (7).

Embodiment 2

Authentication method according to Embodiment 1, characterised in that
a data processing apparatus (4) of the airline (3) generates flight-specific access data for a passenger (1),
the access data are transmitted to a portable passenger device (5, 6) of the passenger (1) by means of a communication network, and
the access data on the passenger device (5, 6) allow access to the aircraft (2).

Embodiment 3

Authentication method according to Embodiment 2, characterised in that the authentication data are transmitted together with the access data to the passenger device (5, 6) in a single message.

Embodiment 4

Authentication method according to any of the preceding Embodiments, characterised in that the generated authentication data contain encryption information for the communication between the passenger device (5, 6) and the on-board communication device (7).

Embodiment 5

Authentication method according to any of the preceding Embodiments, characterised in that the authentication data are transmitted to the passenger device (5, 6) in the form of a link.

Embodiment 6

Authentication method according to any of the preceding Embodiments, characterised in that the access data are processed and provided by software installed on the passenger device (5, 6) for processing and use.

Embodiment 7

Authentication method according to any of the preceding Embodiments, characterised in that the authentication data are processed and provided by software installed on the passenger device (5, 6) for processing and use.

Embodiment 8

Authentication method according to any of the preceding Embodiments, characterised in that during authentication, the hardware address of the passenger device (5, 6) is stored in the on-board communication device (7) and is used for further authentication.

Embodiment 9

Authentication method according to any of the preceding Embodiments, characterised in that after authentication, the on-board communication device (7) allows the passenger (1) personalised access to an in-flight entertainment system using the passenger device (5, 6).

Embodiment 10

Authentication method according to any of the preceding Embodiments, characterised in that after authentication, the on-board communication device (7) allows the passenger (1) access to at least one external data connection using the passenger device (5, 6).

Embodiment 11

Authentication method according to any of the preceding Embodiments, characterised in that the passenger (1) controls at least one playback device of the in-flight entertainment system, which is connected to the on-board communication device (7), using the passenger device (5, 6).

Embodiment 12

Software for a passenger device (5, 6), which controls the passenger device (5, 6) in order to carry out the following steps in the passenger device (5, 6):
  reception of flight-specific access data, generated by a data processing apparatus (4) of the airline (3), via a communication network,
  the access data on the passenger device (5, 6) allowing access to the aircraft (2), characterised by
  receiving additional flight-specific authentication data, generated by the data processing apparatus, for use of an on-board communication device (7) via a communication network, and
  authenticating the passenger device (5, 6) by wirelessly transmitting the authentication data to the on-board communication device (7).

The invention claimed is:

1. An authentication method for a passenger of an aircraft, comprising:
  generating flight-specific authentication data via a processor;
  generating flight-specific access data via the processor;
  generating a single message via the processor,
  wherein the single message comprises the flight-specific authentication data and the flight-specific access data;
  transmitting the single message to a portable passenger device;
  receiving a confirmation that the flight-specific access data is on the passenger device,
  wherein upon receiving the confirmation that the flight-specific access data is on the passenger device permitting the passenger access to the aircraft at an airport;
  providing an on-board communication device on board an aircraft;
  receiving the flight-specific authentication data wirelessly transmitted from the portable passenger device to the on-board communication device via the on-board communication device,
  wherein the on-board communication device receiving the flight-specific authentication data from the portable passenger device authenticates the portable passenger device to the on-board communication device, and
  wherein the flight-specific authentication data permits authentication of the portable passenger device by the on-board communication device;
  presenting the flight-specific authentication data to the on-board communication device from the portable passenger device; and
  receiving media content from the on-board communication device.

2. The method according to claim 1,
  wherein receiving the confirmation that the flight-specific access data is on the passenger device comprises receiving the confirmation that the flight-specific access data is on the portable passenger device at a turnstile to a boarding area of the airport for the aircraft, and
  wherein upon receiving the confirmation that the flight-specific access data is on the passenger device at the turnstile to the boarding area of the airport for the aircraft, permitting the passenger access at the turnstile to the boarding area of the airport for the aircraft.

3. The method according to claim 2, further comprising:
  wirelessly transmitting the flight-specific authentication data from the portable passenger device to the on-board communication device.

4. The method according to claim 2, further comprising:
  providing a receiver,
  wherein receiving the confirmation that the flight-specific access data is on the portable passenger device comprises receiving a visual representation of the flight-specific access data presented on the portable passenger device via the receiver.

5. The method according to claim 2, further comprising:
providing a receiver,
wherein receiving the confirmation that the flight-specific access data is on the portable passenger device comprises receiving a wireless communication from the portable passenger device via the receiver.

6. The method according to claim 2,
wherein the single message is transmitted to the portable passenger device in the form of a link.

7. The method according to claim 2,
wherein the portable passenger device comprises a non-transitory computer readable medium containing a set of instructions that when executed cause the portable passenger device to process the flight-specific access data.

8. The method according to claim 7,
wherein executing the set of instructions causes the portable passenger device to use the flight-specific access data to provide the confirmation that the flight-specific access data is on the portable passenger device to permit access to the aircraft at the airport.

9. The method according to claim 2,
wherein the portable passenger device comprises a non-transitory computer readable medium containing a set of instructions that when executed cause the portable passenger device to process the flight-specific authentication data.

10. The method according to claim 2,
wherein after the on-board communication device authenticates the portable passenger device, the on-board communication device permits access to an in-flight entertainment system using the portable passenger device.

11. The method according to claim 10,
wherein the access to the in-flight entertainment system using the portable passenger device is personalized based on the flight-specific authentication data.

12. The method according to claim 2,
wherein when the flight-specific authentication data transmitted from the portable passenger device to the on-board communication device is received by the on-board communication device, a hardware address of the portable passenger device is received by, and stored in, the on-board communication device and is used for further authentication of the portable passenger device.

13. The method according to claim 2,
wherein after the on-board communication device authenticates the portable passenger device, the on-board communication device permits access to at least one external data connection using the portable passenger device.

14. The method according to claim 13,
wherein after the on-board communication device authenticates the portable passenger device, the on-board communication device permits control of at least one playback device of the in-flight entertainment system that is connected to the on-board communication device using the passenger device.

15. The method according to claim 2,
wherein transmitting the single message to the portable passenger device comprises transmitting the single message to the portable passenger device via a communication network.

16. The method according to claim 2,
wherein the flight-specific authentication data contains encryption information for communication between the portable passenger device and the on-board communication device.

17. The method according to claim 1,
wherein the flight-specific access data and the flight-specific authentication data are specific to a certain flight of the aircraft,
wherein transmitting the single message to the portable passenger device comprises transmitting the single message to the portable passenger device before the passenger is on board the aircraft for the certain flight,
wherein transmitting the single message to the portable passenger device comprises transmitting the single message to the portable passenger device before the passenger is on board the aircraft for the certain flight,
wherein receiving the flight-specific authentication data wirelessly transmitted from the portable passenger device to the on-board communication device via the on-board communication device comprises the on-board communication device receiving the flight-specific authentication data wirelessly transmitted from the portable passenger device to the on-board communication device after the passenger is on board the aircraft for the certain flight, and
wherein receiving the confirmation that the flight-specific access data is on the passenger device comprises receiving the confirmation that the flight-specific access data is on the passenger device before the passenger is on board the aircraft for the certain flight.

18. A non-transitory computer readable medium containing a set of instructions that when executed by a portable passenger device cause the portable passenger device to perform a method for authentication of a passenger of an aircraft, the method comprising:
receiving via a portable passenger device a single message in the form of an electronic boarding pass comprising flight-specific access data and flight-specific authentication data via a communication network,
providing via the portable passenger device a confirmation that the flight-specific access data is on the portable passenger device,
wherein providing via the portable passenger device the confirmation that the flight-specific access data is on the portable passenger device permits the passenger access to an aircraft at the airport;
presenting via the portable passenger device the flight-specific authentication data to an on-board communication device on board the aircraft,
wherein presenting via the portable passenger device the flight-specific authentication data to the on-board communication device permits authentication of the portable passenger device to the on-board communication device; and
receiving media content from the on-board communication device.

19. The non-transitory computer readable medium according to claim 18,
wherein receiving via the portable passenger device the single message in the form of an electronic boarding pass comprising the flight-specific access data and the flight-specific authentication data via the communication network comprises receiving via the portable passenger device an electronic boarding pass comprising the flight-specific access data and the flight-specific authentication data via the communication network.

20. The non-transitory computer readable medium according to claim 19,
   wherein providing via the portable passenger device the confirmation that the flight-specific access data is on the portable passenger device comprises providing via the portable passenger device the confirmation that the flight-specific access data is on the portable passenger device at a turnstile to a boarding area of the airport for the aircraft, and
   wherein providing via the portable passenger device the confirmation that the flight-specific access data is on the portable passenger device at the turnstile permits the passenger access at the turnstile to the boarding area of the airport for the aircraft.

* * * * *